United States Patent
Kadambi et al.

(10) Patent No.: US 8,493,857 B2
(45) Date of Patent: Jul. 23, 2013

(54) MULTIPLE LOGICAL CHANNELS FOR USE IN NETWORK DEVICES

(75) Inventors: Shiri Kadambi, Los Altos Hills, CA (US); Shekhar Ambe, San Jose, CA (US); Mohan Kalkunte, Sunnyvale, CA (US); Sandeep Relan, Bangalore (IN); Allan Christie, Fremont, CA (US); Uri Elzur, Irvine, CA (US); Martin Lund, Menlo Park, CA (US); Daniel Talayco, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 180 days.

(21) Appl. No.: 13/006,968

(22) Filed: Jan. 14, 2011

(65) Prior Publication Data
US 2011/0110236 A1     May 12, 2011

Related U.S. Application Data (63) Continuation of application No. 11/806,427, filed on May 31, 2007, now Pat. No. 8,116,203, which is a continuation of application No. 10/173,422, filed on Jun. 18, 2002, now Pat. No. 7,239,636.

(60) Provisional application No. 60/306,870, filed on Jul. 23, 2001.

(51) Int. Cl.
*H04L 12/26*     (2006.01)
(52) U.S. Cl.
USPC ........................................................ 370/231
(58) Field of Classification Search
None
See application file for complete search history.

(56) References Cited

U.S. PATENT DOCUMENTS

| | | | |
|---|---|---|---|
| 3,749,845 A | 7/1973 | Fraser |
| 4,218,756 A | 8/1980 | Fraser |
| 4,333,020 A | 6/1982 | Maeder |
| 4,395,774 A | 7/1983 | Rapp |

(Continued)

FOREIGN PATENT DOCUMENTS

| EP | 0692892 A2 | 1/1996 |
|---|---|---|
| EP | 0692892 A3 | 1/1996 |

(Continued)

OTHER PUBLICATIONS

Jk Roussos et al., Congestion Control Protocols for Interconnected LANs Supporting Voice and Data Traffic, Computer Communications, Elsevier Science Publishers BV, Amsterdam, Netherlands, vol. 17, No. 1 1994, pp. 25-34, XP000415044.

(Continued)

*Primary Examiner* — Raj Jain
(74) *Attorney, Agent, or Firm* — Thomas|Horstemeyer, LLP (57) ABSTRACT

A method for establishing a virtual channel between network devices is disclosed. In the case of a local network device establishing a virtual channel with a remote network device, a virtual channel request message is sent from the local network device to the remote network device. A virtual channel acknowledgement message and a remote capability list are received and a virtual channel resume message and a local capability list are sent. The virtual channel is then enabled. In the case of a remote network device establishing a virtual channel with a local network device, a virtual channel request message is received from a local network device by a remote network device. A virtual channel acknowledgement message and a remote capability list are sent and a virtual channel resume message and a local capability list are received. The virtual channel is then enabled.

10 Claims, 6 Drawing Sheets

U.S. PATENT DOCUMENTS

| | | |
|---|---|---|
| 4,433,378 A | 2/1984 | Leger |
| 4,445,051 A | 4/1984 | Elmasry |
| 4,449,248 A | 5/1984 | Leslie |
| 4,463,424 A | 7/1984 | Mattson |
| 4,519,068 A | 5/1985 | Krebs |
| 4,545,023 A | 10/1985 | Mizzi |
| 4,590,550 A | 5/1986 | Eilert |
| 4,599,526 A | 7/1986 | Paski |
| 4,649,293 A | 3/1987 | Ducourant |
| 4,680,787 A | 7/1987 | Marry |
| 4,717,838 A | 1/1988 | Brehmer |
| 4,721,866 A | 1/1988 | Chi |
| 4,727,309 A | 2/1988 | Vajdic |
| 4,737,975 A | 4/1988 | Shafer |
| 4,760,571 A | 7/1988 | Schwarz |
| 4,761,822 A | 8/1988 | Maile |
| 4,763,319 A | 8/1988 | Rozenblit |
| 4,777,657 A | 10/1988 | Gillaspie |
| 4,791,324 A | 12/1988 | Hodapp |
| 4,794,649 A | 12/1988 | Fujiwara |
| 4,804,954 A | 2/1989 | Macnak |
| 4,806,796 A | 2/1989 | Bushey |
| 4,807,282 A | 2/1989 | Kazan |
| 4,817,054 A | 3/1989 | Banerjee |
| 4,817,115 A | 3/1989 | Campo |
| 4,821,034 A | 4/1989 | Anderson |
| 4,850,009 A | 7/1989 | Zook |
| 4,890,832 A | 1/1990 | Komaki |
| 4,894,792 A | 1/1990 | Mitchell |
| 4,905,231 A | 2/1990 | Leung |
| 4,916,441 A | 4/1990 | Gombrich |
| 4,964,121 A | 10/1990 | Moore |
| 4,969,206 A | 11/1990 | Desrochers |
| 4,970,406 A | 11/1990 | Fitzpatrick |
| 4,977,611 A | 12/1990 | Maru |
| 4,995,099 A | 2/1991 | Davis |
| 5,008,879 A | 4/1991 | Fischer |
| 5,025,486 A | 6/1991 | Klughart |
| 5,029,183 A | 7/1991 | Tymes |
| 5,031,231 A | 7/1991 | Miyazaki |
| 5,033,109 A | 7/1991 | Kawano |
| 5,041,740 A | 8/1991 | Smith |
| 5,055,659 A | 10/1991 | Hendrick |
| 5,055,660 A | 10/1991 | Bertagna |
| 5,079,452 A | 1/1992 | Lain |
| 5,081,402 A | 1/1992 | Koleda |
| 5,087,099 A | 2/1992 | Stolarczyk |
| 5,115,151 A | 5/1992 | Hull |
| 5,117,501 A | 5/1992 | Childress |
| 5,119,502 A | 6/1992 | Kallin |
| 5,121,408 A | 6/1992 | Cai |
| 5,122,689 A | 6/1992 | Barre |
| 5,123,029 A | 6/1992 | Bantz |
| 5,128,938 A | 7/1992 | Borras |
| 5,134,347 A | 7/1992 | Koleda |
| 5,142,573 A | 8/1992 | Umezawa |
| 5,149,992 A | 9/1992 | Allstot |
| 5,150,361 A | 9/1992 | Wieczorek |
| 5,152,006 A | 9/1992 | Klaus |
| 5,153,878 A | 10/1992 | Krebs |
| 5,162,674 A | 11/1992 | Allstot |
| 5,175,870 A | 12/1992 | Mabey |
| 5,177,378 A | 1/1993 | Nagasawa |
| 5,179,721 A | 1/1993 | Comroe |
| 5,181,200 A | 1/1993 | Harrison |
| 5,196,805 A | 3/1993 | Beckwith |
| 5,216,295 A | 6/1993 | Hoang |
| 5,230,084 A | 7/1993 | Nguyen |
| 5,239,662 A | 8/1993 | Danielson |
| 5,241,542 A | 8/1993 | Natarajan |
| 5,241,691 A | 8/1993 | Owen |
| 5,247,656 A | 9/1993 | Kabuo |
| 5,249,220 A | 9/1993 | Moskowitz |
| 5,249,302 A | 9/1993 | Metroka |
| 5,265,238 A | 11/1993 | Canova |
| 5,265,270 A | 11/1993 | Stengel |
| 5,274,666 A | 12/1993 | Dowdell |
| 5,276,680 A | 1/1994 | Messenger |
| 5,278,831 A | 1/1994 | Mabey |
| 5,289,055 A | 2/1994 | Razavi |
| 5,289,469 A | 2/1994 | Tanaka |
| 5,291,516 A | 3/1994 | Dixon |
| 5,293,639 A | 3/1994 | Wilson |
| 5,296,849 A | 3/1994 | Ide |
| 5,297,144 A | 3/1994 | Gilbert |
| 5,301,196 A | 4/1994 | Ewen |
| 5,304,869 A | 4/1994 | Greason |
| 5,315,591 A | 5/1994 | Brent |
| 5,323,392 A | 6/1994 | Ishii |
| 5,329,192 A | 7/1994 | Wu |
| 5,331,509 A | 7/1994 | Kikinis |
| 5,345,449 A | 9/1994 | Buckingham |
| 5,349,649 A | 9/1994 | Iijima |
| 5,361,397 A | 11/1994 | Wright |
| 5,363,121 A | 11/1994 | Freund |
| 5,373,149 A | 12/1994 | Rasmussen |
| 5,373,506 A | 12/1994 | Tayloe |
| 5,390,206 A | 2/1995 | Rein |
| 5,392,023 A | 2/1995 | D'Avello |
| 5,394,402 A | 2/1995 | Ross |
| 5,406,615 A | 4/1995 | Miller |
| 5,406,643 A | 4/1995 | Burke |
| 5,418,837 A | 5/1995 | Johansson |
| 5,420,529 A | 5/1995 | Guay |
| 5,423,002 A | 6/1995 | Hart |
| 5,426,637 A | 6/1995 | Derby |
| 5,428,636 A | 6/1995 | Meier |
| 5,430,845 A | 7/1995 | Rimmer |
| 5,434,518 A | 7/1995 | Sinh |
| 5,437,329 A | 8/1995 | Brooks |
| 5,440,560 A | 8/1995 | Rypinski |
| 5,455,527 A | 10/1995 | Murphy |
| 5,457,412 A | 10/1995 | Tamba |
| 5,459,412 A | 10/1995 | Mentzer |
| 5,465,081 A | 11/1995 | Todd |
| 5,473,607 A | 12/1995 | Hausman |
| 5,481,265 A | 1/1996 | Russell |
| 5,481,562 A | 1/1996 | Pearson |
| 5,488,319 A | 1/1996 | Lo |
| 5,502,719 A | 3/1996 | Grant |
| 5,510,734 A | 4/1996 | Sone |
| 5,510,748 A | 4/1996 | Erhart |
| 5,519,695 A | 5/1996 | Purohit |
| 5,519,707 A | 5/1996 | Subramanian |
| 5,521,530 A | 5/1996 | Yao |
| 5,533,029 A | 7/1996 | Gardner |
| 5,535,373 A | 7/1996 | Olnowich |
| 5,544,222 A | 8/1996 | Robinson |
| 5,548,230 A | 8/1996 | Gerson |
| 5,548,238 A | 8/1996 | Zhang |
| 5,550,491 A | 8/1996 | Furuta |
| 5,574,724 A | 11/1996 | Bales |
| 5,576,644 A | 11/1996 | Pelella |
| 5,579,487 A | 11/1996 | Meyerson |
| 5,583,456 A | 12/1996 | Kimura |
| 5,583,859 A | 12/1996 | Feldmeier |
| 5,584,048 A | 12/1996 | Wieczorek |
| 5,600,267 A | 2/1997 | Wong |
| 5,603,051 A | 2/1997 | Ezzet |
| 5,606,268 A | 2/1997 | Van Brunt |
| 5,619,497 A | 4/1997 | Gallagher |
| 5,625,308 A | 4/1997 | Matsumoto |
| 5,628,055 A | 5/1997 | Stein |
| 5,630,061 A | 5/1997 | Richter |
| 5,640,356 A | 6/1997 | Gibbs |
| 5,640,399 A | 6/1997 | Rostoker |
| 5,668,809 A | 9/1997 | Rostoker |
| 5,675,583 A | 10/1997 | Bales |
| 5,675,584 A | 10/1997 | Jeong |
| 5,675,585 A | 10/1997 | Bonnot |
| 5,680,038 A | 10/1997 | Fiedler |
| 5,680,633 A | 10/1997 | Koenck |
| 5,689,644 A | 11/1997 | Chou |
| 5,724,361 A | 3/1998 | Fiedler |
| 5,726,588 A | 3/1998 | Fiedler |
| 5,732,346 A | 3/1998 | Lazaridia |
| 5,740,366 A | 4/1998 | Mahany |

| | | | | | | |
|---|---|---|---|---|---|---|
| 5,742,604 A | 4/1998 | Edsall | | 6,151,662 A | 11/2000 | Christie |
| 5,744,366 A | 4/1998 | Kricka | | 6,157,623 A | 12/2000 | Kerstein |
| 5,744,999 A | 4/1998 | Kim | | 6,178,159 B1 | 1/2001 | He |
| 5,748,612 A | 5/1998 | Stoevhase | | 6,185,185 B1 | 2/2001 | Bass |
| 5,748,631 A | 5/1998 | Bergantino | | 6,188,339 B1 | 2/2001 | Hasegawa |
| 5,754,549 A | 5/1998 | DeFoster | | 6,194,950 B1 | 2/2001 | Kibar |
| 5,757,770 A | 5/1998 | Lagoutte | | 6,202,125 B1 | 3/2001 | Patterson |
| 5,758,078 A | 5/1998 | Kurita | | 6,202,129 B1 | 3/2001 | Palanca |
| 5,767,699 A | 6/1998 | Bosnyak | | 6,209,020 B1 | 3/2001 | Angie |
| 5,778,414 A | 7/1998 | Winter | | 6,215,497 B1 | 4/2001 | Leung |
| 5,796,727 A | 8/1998 | Harrison | | 6,218,878 B1 | 4/2001 | Ueno |
| 5,798,658 A | 8/1998 | Werking | | 6,222,380 B1 | 4/2001 | Gerowitz |
| 5,802,258 A | 9/1998 | Chen | | 6,223,239 B1 | 4/2001 | Olarig |
| 5,802,287 A | 9/1998 | Rostoker | | 6,226,680 B1 | 5/2001 | Boucher |
| 5,802,465 A | 9/1998 | Hamalainen | | 6,232,844 B1 | 5/2001 | Talaga |
| 5,802,576 A | 9/1998 | Tzeng | | 6,243,386 B1 | 6/2001 | Chan |
| 5,805,927 A | 9/1998 | Bowes | | 6,259,312 B1 | 7/2001 | Murtojarvi |
| 5,821,809 A | 10/1998 | Boerstler | | 6,265,898 B1 | 7/2001 | Bellaouar |
| 5,826,027 A | 10/1998 | Pedersen | | 6,266,797 B1 | 7/2001 | Godfrey |
| 5,828,653 A | 10/1998 | Goss | | 6,269,427 B1 | 7/2001 | Kultanna |
| 5,829,025 A | 10/1998 | Mittal | | 6,279,035 B1 | 8/2001 | Brown |
| 5,831,985 A | 11/1998 | Sandorfi | | 6,310,501 B1 | 10/2001 | Yamashita |
| 5,839,051 A | 11/1998 | Grimmett | | 6,324,181 B1 | 11/2001 | Wung |
| 5,844,437 A | 12/1998 | Asazawa | | 6,332,179 B1 | 12/2001 | Okpisz |
| 5,848,251 A | 12/1998 | Lomelino | | 6,349,098 B1 | 2/2002 | Purruck |
| 5,859,669 A | 1/1999 | Prentice | | 6,349,365 B1 | 2/2002 | McBride |
| 5,861,881 A | 1/1999 | Freeman | | 6,356,944 B1 | 3/2002 | McCarty |
| 5,875,465 A | 2/1999 | Kilpatrick | | 6,363,011 B1 | 3/2002 | Hirose |
| 5,877,642 A | 3/1999 | Takahashi | | 6,366,583 B2 | 4/2002 | Rowett |
| 5,887,146 A | 3/1999 | Baxter | | 6,373,846 B1 | 4/2002 | Daniel |
| 5,887,187 A | 3/1999 | Rostoker | | 6,374,311 B1 | 4/2002 | Mahany |
| 5,892,382 A | 4/1999 | Ueda | | 6,377,571 B1 | 4/2002 | Tai |
| 5,892,922 A | 4/1999 | Lorenz | | 6,385,201 B1 | 5/2002 | Iwata |
| 5,893,150 A | 4/1999 | Hagersten | | 6,396,832 B1 | 5/2002 | Kranzler |
| 5,893,153 A | 4/1999 | Tzeng | | 6,396,840 B1 | 5/2002 | Rose |
| 5,903,176 A | 5/1999 | Westgate | | 6,424,194 B1 | 7/2002 | Hairapetian |
| 5,905,386 A | 5/1999 | Gerson | | 6,424,624 B1 | 7/2002 | Galand |
| 5,907,553 A | 5/1999 | Kelly | | 6,427,171 B1 | 7/2002 | Craft |
| 5,908,468 A | 6/1999 | Hartmann | | 6,434,620 B1 | 8/2002 | Boucher |
| 5,909,127 A | 6/1999 | Pearson | | 6,438,651 B1 | 8/2002 | Slane |
| 5,909,686 A | 6/1999 | Muller | | 6,459,681 B1 | 10/2002 | Oliva |
| 5,914,955 A | 6/1999 | Rostoker | | 6,463,092 B1 | 10/2002 | Kim |
| 5,937,169 A | 8/1999 | Connery | | 6,470,029 B1 | 10/2002 | Shimizu |
| 5,940,771 A | 8/1999 | Gollnick | | 6,484,224 B1 | 11/2002 | Robins |
| 5,945,847 A | 8/1999 | Ransijn | | 6,490,622 B1 | 12/2002 | Nagami |
| 5,945,858 A | 8/1999 | Sato | | 6,496,479 B1 | 12/2002 | Shionozaki |
| 5,945,863 A | 8/1999 | Coy | | 6,535,518 B1 | 3/2003 | Hu |
| 5,951,637 A | 9/1999 | Kuzma | | 6,538,486 B1 | 3/2003 | Chen |
| 5,961,631 A | 10/1999 | Devereux | | 6,563,827 B1 | 5/2003 | Brueckheimer et al. |
| 5,969,556 A | 10/1999 | Hayakawa | | 6,564,267 B1 | 5/2003 | Lindsay |
| 5,974,508 A | 10/1999 | Maheshwari | | 6,597,689 B1 | 7/2003 | Chiu |
| 5,977,800 A | 11/1999 | Iravani | | 6,606,321 B1 | 8/2003 | Natanson |
| 5,978,379 A | 11/1999 | Chan | | 6,614,791 B1 | 9/2003 | Luciani |
| 5,978,849 A | 11/1999 | Khanna | | 6,614,796 B1 | 9/2003 | Black |
| 5,987,507 A | 11/1999 | Creedon | | 6,630,135 B1 | 10/2003 | Cagle |
| 6,002,279 A | 12/1999 | Evans | | 6,631,351 B1 | 10/2003 | Ramachandran |
| 6,008,670 A | 12/1999 | Pace | | 6,633,936 B1 | 10/2003 | Keller |
| 6,014,041 A | 1/2000 | Somasekhar | | 6,636,485 B1 | 10/2003 | Fijolek |
| 6,014,705 A | 1/2000 | Koenck | | 6,636,947 B1 | 10/2003 | Neal |
| 6,025,746 A | 2/2000 | So | | 6,640,248 B1 | 10/2003 | Jorgensen |
| 6,026,075 A | 2/2000 | Linville | | 6,658,599 B1 | 12/2003 | Linam |
| 6,028,454 A | 2/2000 | Elmasry | | 6,665,759 B2 | 12/2003 | Dawkins |
| 6,037,841 A | 3/2000 | Tanji | | 6,681,283 B1 | 1/2004 | Thekkath et al. |
| 6,037,842 A | 3/2000 | Bryan | | 6,757,291 B1 | 6/2004 | Hu |
| 6,038,254 A | 3/2000 | Ferraiolo | | 6,757,746 B2 | 6/2004 | Boucher |
| 6,061,351 A | 5/2000 | Erimli | | 6,766,389 B2 | 7/2004 | Hayter |
| 6,061,747 A | 5/2000 | Ducaroir | | 6,771,601 B1 | 8/2004 | Aydemir et al. |
| 6,064,626 A | 5/2000 | Stevens | | 6,788,686 B1 | 9/2004 | Khotimsky |
| 6,081,162 A | 6/2000 | Johnson | | 6,788,704 B1 | 9/2004 | Lindsay |
| 6,094,074 A | 7/2000 | Chi | | 6,810,040 B1 | 10/2004 | Lee |
| 6,097,722 A | 8/2000 | Graham | | 6,816,932 B2 | 11/2004 | Cho |
| 6,098,064 A | 8/2000 | Piroll | | 6,822,940 B1 | 11/2004 | Zavalkovsky |
| 6,104,214 A | 8/2000 | Ueda | | 6,845,403 B2 | 1/2005 | Chadalapaka |
| 6,111,425 A | 8/2000 | Bertin | | 6,850,521 B1 | 2/2005 | Kadambi |
| 6,111,859 A | 8/2000 | Godfrey | | 6,859,435 B1 | 2/2005 | Lee |
| 6,114,843 A | 9/2000 | Olah | | 6,862,296 B1 | 3/2005 | Desai |
| 6,118,776 A | 9/2000 | Berman | | 6,862,621 B2 | 3/2005 | Takada |
| 6,122,667 A | 9/2000 | Chung | | 6,865,158 B2 | 3/2005 | Iwamoto |
| 6,128,305 A | 10/2000 | Hjalmtysson | | 6,874,054 B2 | 3/2005 | Clayton |

| | | |
|---|---|---|
| 6,897,697 B2 | 5/2005 | Yin et al. |
| 6,904,519 B2 | 6/2005 | Anand |
| 6,911,855 B2 | 6/2005 | Yin |
| 6,912,221 B1 | 6/2005 | Zadikian |
| 6,912,603 B2 | 6/2005 | Kanazashi |
| 6,927,606 B2 | 8/2005 | Kocaman |
| 6,937,080 B2 | 8/2005 | Hairapetian |
| 6,938,092 B2 | 8/2005 | Burns |
| 6,957,269 B2 | 10/2005 | Williams et al. |
| 6,971,006 B2 | 11/2005 | Krishna |
| 6,976,205 B1 | 12/2005 | Ziai |
| 6,982,583 B2 | 1/2006 | Yin |
| 7,007,103 B2 | 2/2006 | Pinkerton |
| 7,009,985 B2 | 3/2006 | Black |
| 7,062,568 B1 | 6/2006 | Senevirathne |
| 7,181,531 B2 | 2/2007 | Pinkerton |
| 7,190,676 B2 | 3/2007 | Anderson |
| 7,212,534 B2 | 5/2007 | Kadambi et |
| 7,239,636 B2 | 7/2007 | Kadambi et al. |
| 7,346,701 B2 | 3/2008 | Elzur |
| 7,362,769 B2 | 4/2008 | Black |
| 7,366,190 B2 | 4/2008 | Black |
| 7,376,755 B2 | 5/2008 | Pandya |
| 7,382,790 B2 | 6/2008 | Warren |
| 7,385,972 B2 | 6/2008 | Black |
| 7,397,788 B2 | 7/2008 | Mies |
| 7,397,800 B2 | 7/2008 | Elzur |
| 7,400,639 B2 | 7/2008 | Madukkarumukumana |
| 7,411,959 B2 | 8/2008 | Elzur |
| 7,411,960 B1 | 8/2008 | Langley |
| 7,430,171 B2 | 9/2008 | Black |
| 7,433,326 B2 | 10/2008 | Desai |
| 7,515,612 B1 | 4/2009 | Thompson |
| 7,586,850 B2 | 9/2009 | Warren |
| 7,633,949 B2 | 12/2009 | Zadikian |
| 2001/0026553 A1 | 10/2001 | Gallant |
| 2001/0032265 A1 | 10/2001 | Tanaka |
| 2001/0037397 A1 | 11/2001 | Boucher |
| 2002/0078265 A1 | 6/2002 | Frazier |
| 2002/0085562 A1 | 7/2002 | Hufferd |
| 2002/0087723 A1 | 7/2002 | Williams |
| 2002/0089927 A1 | 7/2002 | Fischer |
| 2002/0089931 A1 | 7/2002 | Takada |
| 2002/0095519 A1 | 7/2002 | Philbrick |
| 2002/0103988 A1 | 8/2002 | Domier |
| 2002/0110087 A1 | 8/2002 | Zelig |
| 2002/0130692 A1 | 9/2002 | Hairapetian |
| 2002/0174253 A1 | 11/2002 | Hayter |
| 2002/0190770 A1 | 12/2002 | Yin |
| 2002/0194400 A1 | 12/2002 | Porterfield |
| 2003/0001646 A1 | 1/2003 | Hairapetian |
| 2003/0016628 A1 | 1/2003 | Kadambi |
| 2003/0021229 A1 | 1/2003 | Kadambi |
| 2003/0038809 A1 | 2/2003 | Peng |
| 2003/0046330 A1 | 3/2003 | Hayes |
| 2003/0046418 A1 | 3/2003 | Raval |
| 2003/0061505 A1 | 3/2003 | Sperry |
| 2003/0067337 A1 | 4/2003 | Yin |
| 2003/0079033 A1 | 4/2003 | Craft |
| 2003/0084185 A1 | 5/2003 | Pinkerton |
| 2003/0105977 A1 | 6/2003 | Brabson |
| 2003/0107996 A1 | 6/2003 | Black |
| 2003/0108050 A1 | 6/2003 | Black |
| 2003/0108058 A1 | 6/2003 | Black |
| 2003/0108060 A1 | 6/2003 | Black |
| 2003/0108061 A1 | 6/2003 | Black |
| 2003/0118040 A1 | 6/2003 | Black |
| 2003/0140124 A1 | 7/2003 | Burns |
| 2003/0169753 A1 | 9/2003 | Black |
| 2003/0172342 A1 | 9/2003 | Elzur |
| 2003/0174720 A1 | 9/2003 | Black |
| 2003/0174721 A1 | 9/2003 | Black |
| 2003/0174722 A1 | 9/2003 | Black |
| 2003/0198251 A1 | 10/2003 | Black |
| 2003/0204631 A1 | 10/2003 | Pinkerton |
| 2003/0204634 A1 | 10/2003 | Pinkerton |
| 2003/0227908 A1 | 12/2003 | Scoggins |
| 2004/0019652 A1 | 1/2004 | Freimuth |
| 2004/0042458 A1 | 3/2004 | Elzur |
| 2004/0042464 A1 | 3/2004 | Elzur |
| 2004/0042483 A1 | 3/2004 | Elzur |
| 2004/0042487 A1 | 3/2004 | Ossman |
| 2004/0044798 A1 | 3/2004 | Elzur |
| 2004/0062245 A1 | 4/2004 | Sharp |
| 2004/0062275 A1 | 4/2004 | Siddabathuni |
| 2004/0081186 A1 | 4/2004 | Warren et al. |
| 2004/0085972 A1 | 5/2004 | Warren et al. |
| 2004/0085994 A1 | 5/2004 | Warren et al. |
| 2004/0093411 A1 | 5/2004 | Elzur et al. |
| 2004/0133713 A1 | 7/2004 | Elzur |
| 2004/0227544 A1 | 11/2004 | Yin et al. |
| 2005/0027911 A1 | 2/2005 | Hayter et al. |
| 2005/0160139 A1 | 7/2005 | Boucher et al. |
| 2005/0165980 A1 | 7/2005 | Clayton et al. |
| 2005/0184765 A1 | 8/2005 | Hairapetian |
| 2005/0185654 A1 | 8/2005 | Zadikian et al. |
| 2005/0216597 A1 | 9/2005 | Shah |
| 2005/0278459 A1 | 12/2005 | Boucher |
| 2006/0165115 A1 | 7/2006 | Warren |
| 2006/0176094 A1 | 8/2006 | Hairapetian |
| 2007/0170966 A1 | 7/2007 | Hairapetian |
| 2007/0171914 A1 | 7/2007 | Kadambi |
| 2007/0237163 A1 | 10/2007 | Kadambi |
| 2008/0025315 A1 | 1/2008 | Elzur |
| 2008/0095182 A1 | 4/2008 | Elzur |
| 2008/0151922 A1 | 6/2008 | Elzur |
| 2008/0205421 A1 | 8/2008 | Black |
| 2008/0276018 A1 | 11/2008 | Hayter |
| 2008/0298369 A1 | 12/2008 | Elzur |
| 2009/0074408 A1 | 3/2009 | Black |
| 2009/0128380 A1 | 5/2009 | Hairapetian |

FOREIGN PATENT DOCUMENTS

| | | |
|---|---|---|
| EP | 0465090 B1 | 4/1996 |
| EP | 1039718 A2 | 9/2000 |
| EP | 1280302 A2 | 1/2003 |
| EP | 0692892 B1 | 4/2003 |
| EP | 1345382 A2 | 9/2003 |
| EP | 1357721 A2 | 10/2003 |
| EP | 1460805 A2 | 9/2004 |
| EP | 1460806 A2 | 9/2004 |
| EP | 14608040 A2 | 9/2004 |
| EP | 1280302 B1 | 3/2005 |
| EP | 1206075 B1 | 11/2007 |
| EP | 1537695 B1 | 2/2009 |
| FR | 2725573 A1 | 11/1994 |
| FR | 19940012105 | 4/1996 |
| JP | 3-237553 A2 | 10/1991 |
| JP | 8-331124 A2 | 12/1996 |
| JP | 9-098165 A2 | 4/1997 |
| JP | 10-313314 | 11/1998 |
| WO | WO 97/28505 A1 | 8/1997 |
| WO | WO 99/00948 | 1/1999 |
| WO | WO 00/56013 | 9/2000 |
| WO | WO 00/56113 A1 | 9/2000 |
| WO | WO 20011086910 A1 | 11/2001 |
| WO | WO 02/35784 | 5/2002 |
| WO | WO 03/079612 | 9/2003 |

OTHER PUBLICATIONS

M. Aydemir et al., Flow Control in GBS Ethernet Networks, IEEE Exec Study Group on QOS and Flow Control, Nov. 11, 1998, pp. 1-31, XP002258501.

Lucent Technologies, 3GPP TSG-SA2 Drafting Session, S2-002211, Nov. 29-30, 2000, p. 1.

3rd Generation Partnership Project; Technical Specification Group Services and System Aspects; IP Multimedia (IM) Subsystem-Stage 2 (3G TS 23.228 version 1.4.0), Nov. 2000, clean text version, pp. 1-102.

3rd Generation Partnership Project; Technical Specification Group Services and System Aspects; IP Multimedia (IM) Subsystem-Stage 2 (3G TS 23.228 version 1.4.0), Nov. 2000, diff-marked text version, pp. 1-116.

3rd Generation Partnership Project; Technical Specification Group Services and System Aspects; IP Multimedia (IM) Subsystem-Stage 2 (3G TS 23.228 version 1.7.0), Feb. 2001, marked text version, pp. 1-132.

3rd Generation Partnership Project; Technical Specification Group Services and System Aspects; IP Multimedia (IM) Subsystem-Stage 2 (3G TS 23.228 version 5.0.0) Apr. 2001, pp. 1-126.

Non-Final Office Action Received for U.S. Appl. No. 10/173,422, mailed on Jun. 28, 2006, 25 pages.

Final Office Action Received for U.S. Appl. 10/173,422, mailed on Oct. 24, 2006, 19 pages.

Notice of Allowance Received for U.S. Appl. No. 10/173,422, mailed on Mar. 7, 2007, 7 pages.

Notice of Allowance Received for U.S. Appl. No. 10/173,421, mailed on Dec. 29, 2006, 11 pages.

Non-Final Office Action Received for U.S. Appl. No. 11/806,427, mailed on Jul. 20, 2009, 11 pages.

Index of /ftp/Specs/archive/23_series/23.228, date retrieved Oct. 19, 2009, document available at http://www.3gpp.org/ftp/Specs/archive/23_series/23.228/.

Joint Claim Construction and Prehearing Statement Pursuant to N. D. Cal. Patent L.R. 4-3, United States District Court, Central District of California, Southern Division, Broadcom Corporation v. Emulex Corporation, Case No. SACV09-1058 JVS (Anx), dated Sep. 24, 2010.

Order Regarding Markman/Claim Construction Hearing, United States District Court, Central District of California, Southern Division, Broadcom Corporation v. Emulex Corporation, Case No. SACV09-1058 JVS (ANx), SACV10-03963-JVS (ANx), dated Dec. 17, 2010.

Ewen, "Single-Chip 1062 Mbaud CMOS Transceiver for Serial Data Communication," 1995 IEEE International Solid-State Circuits Conference, Digest of Technical Papers, First Edition, Feb. 1995, pp. 1-2, 6013, 32-33,36, IEEE Catalog No. 95CH35753, Publisher: John H. Wuorinen, Castine, ME 04421.

Fiedler, "A 1.0625Gbps Transceiver with 2x-Oversampling and Transmit Signal Pre-Emphasis", 1997 IEEE International Solid-State Circuits Conference, Digest of Technical Papers, ISSCC97, Session 15, Serial Data Communications, Paper FP 15.1, pp. 238-239, 464.

Fujimori, "A 90-dB SNR 2.5 MHz Output-Rate ADC Using Cascaded Multibit Delta-Sigma Modulation at 8x Oversampling Ratio", IEEE Journal of Solid-State Circuits, vol. 35, No. 12, Dec. 2000, pp. 1820-1828.

Fiedler, "A CMOS Pulse Density Modulator for High-Resolution A/D Converters", IEEE Journal of Solid-State Circuits, vol. sc-19, No. 6, Dec. 1984, pp. 995-996.

Momtaz, "A Fully Integrated SONET OC-48 Transceiver in Standard CMOS", IEEE Journal of Solid-State Circuits, vol. 36, No. 12, Dec. 2001, pp. 1964-1973.

Corner, "A CMOS Phase Detector for Mixed Signal ASIC Application", IEEE 1993, pp. 232-234.

Hairapetian, "An 81-MHz If Receiver in CMOS", IEEE Journal of Solid-State Circuits, vol. 31, No. 12, Dec. 1996, pp. 1981-1986.

Fischer, "CiNIC-Calpoly Intelligent NIC", A Thesis Presented to the Faculty of California Polytechnic State University, San Luis Obispo, Jun. 2001, pp. i-xi, 1-137.

Tanenbaum, Excerpt from Computer Networks, Third Edition, 1996, Publisher: Prentice Hall PTF, Upper Saddle River, New Jersey 07458, pp. 556-558.

Allstot, "Current-Mode Logic Techniques for CMOS Mixed-Mode ASIC's", IEEE Custom Integrated Circuits Conference, 1991, pp. 25.1.1-25.2.4.

Shivam, "EMP: Zero-Copy OS-bypass NIC-Driven Gigabit Ethernet Message Passing", SC1001 Nov. 2001, Denver, CO.

Nayfeh, "Exploring the Design Space for a Shared-Cache Multiprocessor", Computer Systems Laboratory, Stanford University, IEEE, 1994, pp. 166-175.

Fibre Channel Arbitration Loop (FC-AL), X3.262-199x, X3T11/Project 960D/Rev. 4.5, working draft proposal, American National Standard for Information Technology, Jun. 1, 1995, pp. i-x, 1-92.

Firbe Channel Physical and Signaling Interface (FC-PH), X3.230-199x, X3T11 Project 755D/Rev. 4.3, working draft proposal, American National Standard for Information Systems, Jun. 1, 1994, pp. i-xxxiv, 1-338, Index.

Yeh, "Introduction to TCP/IP Offload Engine (TOA)", 10 Gigabit Ethernet Alliance, Version 1.0, Apr. 2002.

Sanchez, "Iterations in TCP/P-Ethernet Network Optimization", A Master's Thesis Presented to the Faculty of California, Polytechnic State University, San Luis Obispo, Jun. 1999, pp. i-xiii, 1-156.

Allam, "Low Power CMOS Logic Families", IEEE, 1999, pp. 419-422.

Cao, "OC-192 Transmitter and Receiver in Standard 0.18-urn CMOS", IEEE Journal of Solid-State Circuits, vol. 37, No. 12, Dec. 2002, pp. 1768-1780.

Series H: Audiovisual and Multimedia Systems, Infrastructure of Audiovisual Services-Services and Terminal Equipment for Audiovisual Services; Visual Telephone Systems and Equipment for Local Area Networks Which Provide a Non-Guaranteed Quality of Services, ITU-T Recommendation H.323, Superseded by a more recent version, Nov. 1996, pp. i-v, 1-71, 1.

Pinkerton, "The Case for RDMA", May 29, 2002, pp. 1-27.

Pope, "Tip of the Week: Net-Interface Accelerators Can Help or Hinder", Network System Design Line, Feb. 26, 2007, http://www.networksystemdesignline.com, pp. 1-2.

Dally, "Virtual-Channel Flow Control", IEEE Transactions on Parallel and Distributed Systems, vol. 3, No. 2, Mar. 1992, pp. 194-205.

R. Seifert, Gigabit Ethernet (addison-Wesley 1998).

H. Frazier, "The 802.3z Gigabit Ethernet Standard", LAN MAN Standards Committee of the IEEE Computer Society (May/Jun. 1998).

Kadambi et al., Gigabit Ethernet: Migrating to High-Band LANs (Pretice Hall 1999).

K. Yoshigoe and K. Christensen, "RATE Control for Bandwidth Allocated Services in IEEE 802.3 Ethernet," LCN archive - Proceedings of the 26th Annual IEEE Conference on Local Computer Networks (2001).

J. Dunlop, "Techniques for the Integration of Packet Voice and Data on IEEE 802.3 LANs," Computer Communications vol. 12, Issue 5 (Oct. 1989).

IEEE Link Task Force Autodetect, "Spedification for Nway Autodetect," Version 1.0 (Apr. 10, 1994).

R. Cummings et al., "Fiber Channel Physical and Signaling Interface (FC-PH) Rev. 4.3," American National Standard for Information Systems (Jun. 1, 1994).

W. Rickard, Fibre Channel As a Network Backbone, WESCON/94, Idea/Microelectronics, Conference Record (Sep. 27-29, 1994).

I. Crayford, "Fast Ethernet Gets Plug-and-Play," Westcon Conference, IEEE Center, Hoes Lane, US, pp. 354-359 (Nov. 7, 1995).

Newman et al., "Flow Labeled IP A Connectionless Approach to ATM," INFOCOM '96, Fifteenth Annual Joint Conference of the IEEE Computer Societies, Networking the Next Generation, IEEE Proceedings (1996).

IEEE Standard 802.3x-1997, "Specification for 802.3 Full Duplex Operation".

Plaintiff Broadcom Corporation's Opening Markman Brief, United States Districk Court, Central District of California, Southern Division, Broadcom Corporation v. Elulex Corporation, Case No. SACV09-01058 JVS (ANx), SACV10-03963-JVS (ANx), dated Oct. 18, 2010.

Defendant and Counterclaim Plaintiff Emulex Corporation's Opening Claim Construction Brief, United States District Court, Central District of California, Broadcom Corporation v. Emulex Corporation, Case No. SACV09-1058-JVS (ANx) consilidated with CV 10-3963 JVS (ANx), dated Oct. 18, 2010.

Plaintiff Broadcom Corporation's Reply Markman Brief, United States District Court, Central District of California, Southern Division, Broadcom Corporation v. Emulex Corporation, Case No. SACV09-01058 JVS (ANx), SACV 1003963-JVS (ANx), dated Nov. 8, 2010.

Defendant and Counterclaim Plaintiff Emulex Corporation's Reply Claim Construction Brief, United States District Court, Central District of California, Broadcom Corporation v. Emulex Corporation, Case No. SACV 09-1058-JVS (ANx) consolidated with CV 10-3963 JVS (ANx), dated Nov. 8, 2010.

Order Regarding Markman/Claim Construction Hearing, United States District Court, Central District of California, Broadcom Corporation v. Emulex Corporation, Case No. SACV 09-01058-JVS (ANx) consolidated SACV 10-03963-JVS (Anx), dated Dec. 17, 2010.

E. Varvarigos and V. Sharma, "The Ready-to-Go Virtual Circuit Protocol: A Loss Free Protocol for Multigigabit Networks Using FIFO Buffers, " IEEE/ACM Transactions on Networking, vol. 5, issue 5 (1997).

P. Montessoro and D. Pierattoni, "A New Approach for Future Network Architecture Design," Proceedings of SSGRR 2001 (Aug. 2001).

W. Noureddine and F. Tobagi, "Selective Back-Pressure in Switched Ethernet LASs", Global Telecommunications Conference, GLOBECOM '99 (1999), pp. 1256-1263, vol. 1 (1999).

J. Kurose and K. Ross, Computer Networking: A Top-Down Approach (Addison-Wesley 2001).

M. Ragagopal et al., "IP and ARP over Fibre Channel," Network Working Group, Request for Comments: 2625 (Jun. 1999).

K.S. Teow, "Definitions of Managed Objects for the Fabric Element in Fibre Channel Standard," Network Working Group, Request for Comments: 2837 (May 2000).

M. Seaman et al., Integrated Service Mappings on IEEE 802 Networks Working Group, Request for Comments: 2815 (May 2000).

3rd Generation Partnership Project: Technical Specification Group Services and System Aspects; IP Multimedia (IM) System-Stage 2; (3G TS 23,228 version 2.0.0) (2001).

IEEE Standards for Local and Metropolitan Area Networks: Supplements to Carrier Sense Multiple Access with Collision Detection (CSMA/CD) Access Method and Physical Layer Specifications—Specifications for 802.3 Full Duplex Operation and Physical Layer Specification for 100 Mb/s Operation on Two Pairs of Category 3 or Better Balanced Twisted Pair Cable (100 BASE-T2) IEEE Std. 802. 3x-1997 and IEEE Std. 802.3y-1997, Supplements to ISO/ IEC 8802. 3; 1996 [ANS/IEEE Std. 802.3, 1996 Edition].

Defendant Emulex Corporation's Disclosure of Preliminary Invalidity Contentions, with Exhibit A, Broadcom Corporation vs. Emulex Corporation, Case No, SACV 09-1058-JVS (ANx), Jun. 28, 2010.

Defendant Emulex Corporation's First Amended Disclosure of Preliminary Invalidity Contentions, with Exhibit A, Broadcom Corporation vs. Emulex Corporation, Case No. SACV 09-1058-JVS (ANx), Aug. 30, 2010.

Emulex Corporation's Answer, Affirmative Defenses, and Counterclaims, Demand for Jury Trial, Broadcom Corporation vs. Emulex Corporation, Case No. SACV 09-1058-JVS (ANx), Nov. 4, 2009.

Excerpts from EP02014915 File History as cited in Emulex Corporation's Answer, Affirmative Defenses, and Counterclaims, Demand for Jury Trial, Broadcom Corporation vs. Emulex Corporation, Case No. SACV 09-1058-JVS (ANx), Nov. 4, 2009.

(Zero-Loss Mode)

Fig. 1

(HOL Avoidance Mode)

| Bit | 31 30 29 28 27 26 25 24 | 23 22 21 20 19 18 17 16 | 15 14 13 12 11 10 9 8 | 7 6 5 4 3 2 1 0 |
|---|---|---|---|---|
| +0 | DA | | | |
| +32 | SA | | DA | |
| +64 | SA | | | |
| +96 | RESERVED | PROTOCOL | ETHERTYPE | |
| +128 | VC_TAG | | | |
| +160 | OPT_PARAMS | | | |
| Varies | DATA | | | |

| Field | Bit(S) | Description |
|---|---|---|
| DA | 0:47 | Destination Address, value set from register for control frame |
| SA | 95:48 | Source Address, value set from register for control frame |
| ETHERTYPE | 111:96 | Ethernet Type Field, value set from register |
| PROTOCOL | 119:112 | Subtype of this ether type, must be 1 for VC packet type |
| RESERVED | 127:119 | Reserved, can be used for VC priority or VC tunneling |
| VC_TAG | 159:128 | VC opcode and parameters |
| OPT_PARAMS | 160+ | Optional additional parameters for command |
| DATA | Varies | Data following tag insertion, offset depends on VC command |

Fig. 8

| Bit | 31 30 29 28 27 26 25 24 23 22 21 20 19 18 17 16 15 14 13 12 11 10 9 8 | 7 6 5 4 3 2 1 0 |
|---|---|---|
| +0 | PARAMS | OPCODE0 |

| Field | Bit(S) | Description |
|---|---|---|
| OPCODE0 | 7:0 | Operation opcode. Must be less than 0xFF.<br>0x0 RESERVED<br>0x1 SELECTIVE_FLOW Selective flow control<br>0x2 - 0xFE RESERVED<br>0xFF INACTIVE Move to opcode1 for evaluation |
| PARAMS | 31:8 | Parameters; format depends on opcode |

Fig. 9

| Bit | 31 30 29 28 27 26 25 24 23 22 21 20 19 18 17 16 | 15 14 13 12 11 10 9 8 | 7 6 5 4 3 2 1 0 |
|---|---|---|---|
| +0 | PARAMS | OPCODE1 | OPCODE0_ALL1 |

| Field | Bit(S) | Description |
|---|---|---|
| OPCODE0_ALL1 | 7:0 | Opcode 0; Must be equal to 0xFF |
| OPCODE1 | 15:8 | Operation opcode. Must be less than 0xFF.<br><br>0x0 RESERVED<br>0x1 SEL_FLOW_PRIORITY Priority based elective flow control<br>0x2 EGRESS_PRIORITY_FLOW: Flow control based on egress congestion with priority indications<br>0x03 - 0xFE RESERVED<br>0xFF INACTIVE Move to opcode2 for evaluation |
| PARAMS | 31:16 | Parameters; format depends on opcode1 |

Fig. 10

| Bit | 31 30 29 28 27 26 25 24 23 22 21 20 19 18 17 16 | 15 14 13 12 11 10 9 8 | 7 6 5 4 3 2 1 0 |
|---|---|---|---|
| +0 | OPCODE2 | OPCODE1_ALL1 | OPCODE0_ALL1 |

| Field | Bit(S) | Description |
|---|---|---|
| OPCODE2 | 31:16 | Opcode field for header type 2. Must be less than 0xFFFF.<br><br>Parameters for these opcodes (if any) must be in words following the VC tag.<br><br>0x0000 - 0xFFFE RESERVED<br>0xFFFF INACTIVE Move to data for opcode |
| OPCODE1_ALL1 | 15:8 | Opcode 1; Must be equal to 0xFF |
| OPCODE0_ALL1 | 7:0 | Opcode 0; Must be equal to 0xFF |

Fig. 11

| Bit | 31 30 29 28 27 26 25 24 | 23 22 21 20 19 18 17 16 | 15 14 13 12 11 10 9 8 | 7 6 5 4 3 2 1 0 |
|---|---|---|---|---|
| +0 | RESERVED | PRIORITY_BITMAP | OPCODE1_1 | OPCODE0_ALL1 |

| Field | Bit(s) | Description |
|---|---|---|
| OPCODE0_ALL1 | 7:0 | Opcode 0; Must be equal to 0xFF |
| OPCODE1_1 | 15:8 | Value is 0x1 indicating SEL_FLOW_PRIORITY operation |
| PRIORITY_BITMAP | 23:16 | Bit map indicating the congestion state of 802.1p priorities<br>Bit states indicate:<br>0   No congestion for this priority. De-assert flow control for this priority<br>1   Congestion present for this priority. Assert flow control for this priority |
| RESERVED | 31:28 | Reserved |

Fig. 12

MULTIPLE LOGICAL CHANNELS FOR USE IN NETWORK DEVICES

REFERENCE TO RELATED APPLICATION

This application is a continuation of United States patent application Ser. No. 11/806,427, filed on May 31, 2007, now U.S. Pat. No 8,116,203 which is a continuation of United States patent application Ser. No. 10/173,422, filed on Jun. 18, 2002, now Pat. No. 7,239,636 which in turn makes reference to, claims priority to and claims the benefit of U.S Povisional Patent Application No. 60/306,870, filed on Jul. 23, 2001. The subject matter of the earlier filed patent applications is hereby incorporated herein by reference.

BACKGROUND OF THE INVENTION

1. Field of Invention

The present invention relates to a method and apparatus of selectively exchanging control and state information (extensible to exchange of upper layer application data) between network devices. The control and state information is exchanged via a frame that is scalable to support many different applications. More specifically, multiple virtual channels are established between network devices by blocking or control of certain data flows, without blocking the flow of other data through the same link, effectively increasing the bandwidth utilization of the link and the throughput of the network device.

2. Description of Related Art

Figure 1:
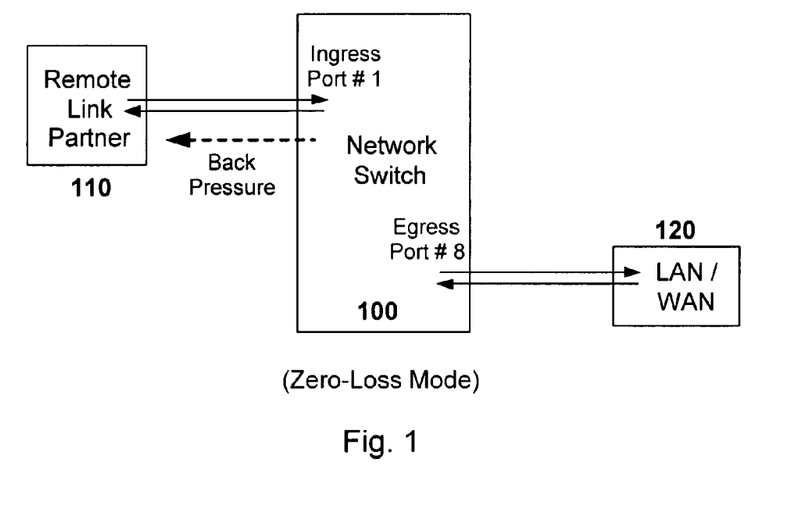
FIG. 1 illustrates a zero-loss process of dealing with congestion in a network switch.

Many types of network devices are necessary to allow a network to function properly. One such network device is commonly referred to as a switch. A switch is defined as a network component that receives incoming data, stores the data temporarily, and sends the data back out on another port. The switching is accomplished by determining a destination address from the incoming data and sending the data to a port or set of ports associated with the destination address. The control and monitoring of a switch is essential in handling the flow of data in high speed networks. The effective functioning of the switch can be enhanced by control of the traffic through the switch, including monitoring and modification of that traffic. One such function is the control of the selective flow of data through the switch in response to congestion, either internal or external to the switch. This function is also illustrative since it involves the exchange of control and state information between network devices Ethernet switches generally support two common mechanisms to handle resource congestion inside the switch. The ingress backpressure mechanism enables the switch to flow control the traffic sent by a remote link partner, i.e. another network connected to the switch. This process is illustrated in FIG. 1. The Ethernet switch 100 keeps track of the number of packets or cells received on each ingress port, such as port #1 connected to remote link partner 110. If the number of bytes or cells received on an ingress port exceeds the configurable ingress back pressure threshold, then the switch exerts back pressure. In another technique, if the number of packets received on an egress port, such as egress port #8 connected to the local or wide area networks 120, exceeds a pre-configured threshold value, then egress generates an ingress back pressure request to the ingress port.

In full duplex mode, this back pressure is achieved by sending a MAC (media access control) control frame called a "pause frame." Upon receiving the pause frame, the remote link partner stops sending further packets until the timer specified in the pause frame expires or the switch explicitly sends resume frame (pause frame) with timer=0). Thus, the entire link remains idle until communication resumes. This flow control mechanism on a full duplex port is specified in the IEEE std. 802.3x, in which it has been specified that an ingress port in a full duplex mode should send pause frames for flow control.

In half duplex mode, this back pressure mechanism can be achieved by enabling a jamming signal and thereby preventing any other station from sending the packet. For ports that are in half duplex mode, this prevents any other station from sending packets to the port. The enabling of jamming signal in half duplex is not a standard, but is done by many of the switch vendors.

These techniques help in avoiding losing any packet that was being received and forwarded by the ingress port and it is generally termed as a zero-loss mode of switching, or as a zero packet loss mode of switching. This process has other side effects, however, including an adverse impact on the switch's throughput and wire speed switch rate.

Figure 2:
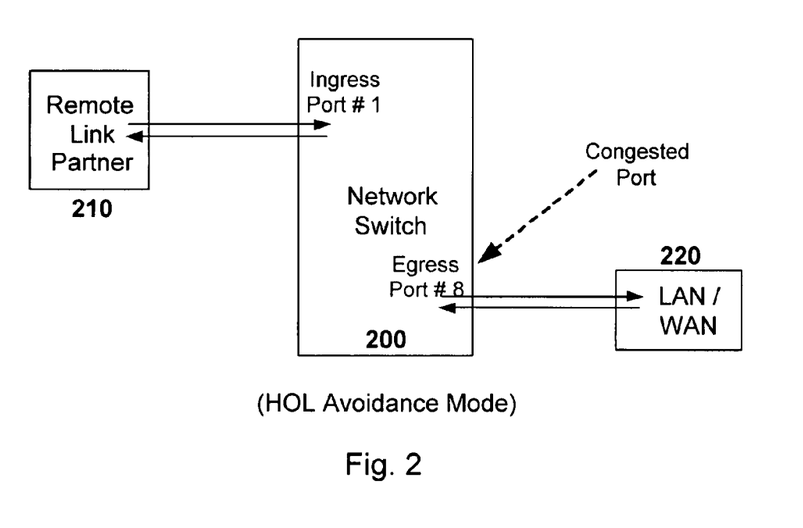
FIG. 2 illustrates the HOL avoidance process of dealing with congestion in a network switch.

In addition, Ethernet switches also support a mechanism to handle head of line (HOL) blocking avoidance. This mechanism is illustrated in FIG. 2. The Ethernet switch 200 is connected to remote link parnter 210 through an ingress port, such as port #1. The switch 200 keeps track of number of bytes or cells that are sitting on an egress port, such as egress port #8 connected to the local or wide area networks, or any type of networks 220. If the number of bytes or cells or packets exceed the HOL threshold value then all packets going to that egress port are dropped at the ingress port itself. The HOL values are generally configured by software depending on the size of the packet memory. This is generally termed as a HOL avoidance mode of switching. In this HOL avoidance mode, switch performance is sustained by sacrificing packets.

In a zero-loss mechanism, the switch never drops any packet for any traffic scenario, the worst case being all ingress ports are sending packets to one egress port. In this zero-loss mode, the switch will hit the ingress back pressure threshold before hitting the egress HOL limit, so that it exerts Ingress back pressure rather than dropping packet going to the congested port. As such, there are disadvantages to both types of mechanisms used for controlling the flow of data through a switch.

In terms of providing actual control of the flow of data through a network device, the above processes are often crude with respect to the aspects they allow to be controlled. The present implementations can achieve zero-packet loss but the throughput of the network is often decreased. Alternatively, implementations dealing with HOL blocking can sustain throughput, but the loss of packets increases. Thus, there is a need for a mechanism in a network device that achieves zero-loss processing of data that does not have the detrimental effects on the performance of the network device found in the prior art processes. Additionally, there is also a need for selective flow control mechanism that can also be utilized to allow the flow of data having a certain priority to be unimpeded.

SUMMARY OF THE INVENTION

It is an object of this invention to overcome the drawbacks of the above-described conventional network devices and methods. The above control and monitoring of the processes of a network device can be accomplished through the establishment of multiple virtual channels between network devices. These virtual channels allow for the selective control of flows through the network device. The virtual channels also can provide for in-band management of the network device, as well as traffic shaping and rate control. The use of virtual channels facilitates operations, administration, and maintenance functions and simplifies device detection and remote monitoring of the functions of the network device.

According to one aspect of this invention, a method for establishing a virtual channel between network devices is disclosed. In the case of a local network device establishing a virtual channel with a remote network device, a virtual channel request message is sent from the local network device to the remote network device. A virtual channel acknowledgement message and a remote capability list are received and a virtual channel resume message and a local capability list are sent. The virtual channel is then enabled. Similarly, in the case of a remote network device establishing a virtual channel with a local network device, a virtual channel request message sent from a remote network device, is received by a local network device. A virtual channel acknowledgement message and a remote capability list are sent and a virtual channel resume message and a local capability list are received. The virtual channel is then enabled.

Additionally, the virtual channel request message may be an Ethernet frame that is interpreted as a pause frame when the remote network device is not virtual channel capable. Also, a request retry timer may be used to wait for a specified period after the request message is sent and then resent after the specified period when no virtual channel acknowledgement message has been received. A request retry limit value may be used to limit the number of times the request message is sent. Similarly, an acknowledgement retry timer may be used to wait a specified period after the acknowledgement message is sent and then resent after the specified period when no virtual channel resume message has been received. Also, an acknowledgement retry limit value may be used to limit the number of times the acknowledgement message is sent.

Also, the local and remote capability lists can be in the form of link advertisement registers where each bit of the registers refers to specific capabilities of the local and remote network devices, and these registers are sent and received in the steps of the method. Furthermore, the virtual channel request message, the virtual channel acknowledgement message and the virtual channel resume message can each have an Ethernet frame format with a source address and a destination address being one of an address of the local network device and an address of the remote network device.

In addition, the virtual channel may be established through auto-negotiation between the local network device and the remote network device and can use the sending and receipt of next pages to exchange virtual channel data.

In another aspect of the invention, a virtual channel capable network device is disclosed. The device includes means for sending or receiving a virtual channel request message from or to a second network device and means for sending or receiving a virtual channel acknowledgement message and a first capability list. The device also includes means for sending or receiving a virtual channel resume message and a second capability list and means for enabling the virtual channel. When the virtual channel acknowledgement message is sent by the virtual channel capable network device, the first capability list is a capability list for the virtual channel capable network device and when the virtual channel acknowledgement message is received by the virtual channel capable network device, the first capability list is a capability list for the second network device.

Additionally, the network device may include means for sending or receiving an Ethernet frame that is interpreted as a pause frame when the second network device is not virtual channel capable. Also, the device may have one or both of a request retry timer and an acknowledgement retry timer, used to determine the period after which either the request or acknowledgement messages should be resent if the proper reply is not received. The device may also use one or both of a request retry limit value and an acknowledgement retry limit value in determining the number of times a message should be resent.

Also, link advertisement registers may be used, where each bit of the registers refers to specific capabilities of the local and remote network devices. The virtual channel request message, the virtual channel acknowledgement message and the virtual channel resume message can each have an Ethernet frame format with a source address and a destination address being one of an address of the virtual channel capable network device and an address of the second network device.

The device may also include means for auto-negotiation (as specified in the IEEE std 802.3) between the virtual channel capable network device and the second network device to establish communications there between. Also, the device may also incorporate means for sending and receiving next pages used to exchange virtual channel data.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

The virtual channel (VC) protocol is intended for exchange of proprietary control between network devices such as switches, routers, network interface cards (NICs), cable modems and related devices. The VC protocol, according to an embodiment of the invention, enables value add functions such as selective flow control, operations, administration and maintenance (OAM) functions, in-band management and many other functions between network devices. The VC protocol can be applied to any media between network devices that are so configured.

The VC protocol has many applications, including selective flow control, in-band management, rate control, traffic shaping, device detection, OAM functions, remote monitoring, and remote alarms.

An exemplary application of the virtual channels of the present invention is directed to selective flow control (SFC). The IEEE 802.3 standard defines link level flow control between two Ethernet devices. For example, if a switch port is congested, it can send a flow control frame to the remote end to stop all incoming traffic. However, if the remote is sending both delay sensitive and delivery sensitive traffic, it is desirable to flow control only the delivery sensitive traffic and not the delay sensitive traffic. This is the feature referred to as selective flow control (SFC).

Figure 3:
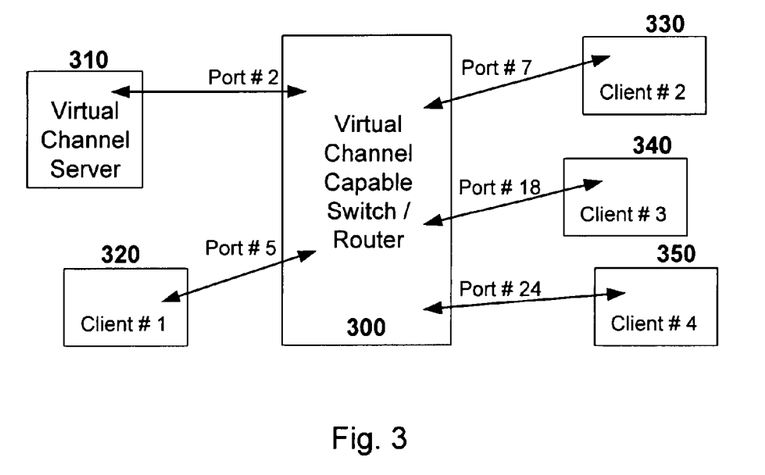
FIG. 3 illustrates a virtual channel (VC) capable network device linked with remote link partner.

In FIG. 3, a VC capable server 310 is connected to a VC capable switch 300 on port 2 and its clients 320-350 are connected on switch ports 5, 7, 18 and 24. As an example, if client #3 creates congestion on port 18 and port 18 hits the egress congestion threshold, the egress will inform the ingress port 2 of the congestion. Using the VC flow ID technique, port 2 sends a VC frame to server 310 indicating congestion for the given flow ID. The server in turn will stop sending any packets for that flow ID (mapped to the egress port 18); thereby there will be no packet loss for packets going to egress port 18. Now, the server can continue sending packets to other clients connected to other egress ports, thereby the link bandwidth is fully utilized.

Another important application of the VC protocol is in-band management. This functionality permits a management agent to control a device through a port, rather than through a dedicated bus, such as peripheral component interconnect (PCI). In particular, an internal, VC enabled port can provide full access to the register and memory space of the device, as well as provide the ability to set up remote monitoring, RMON-like trap conditions which will generate an alert by sending a VC frame. The device can then be fully managed without the need for a dedicated CPU.

The architectural paradigm for the VC framework is as follows. The framework enables most common applications and has a minimal impact on link bandwidth. The VC is enabled based on a hardware mechanism with optional software control and the VC does not violate any layer standard (IEEE, IETF). The framework is flexible to allow multiple applications and functions, the architecture is scalable for complex applications and enables customer specific applications to provide differentiation among system vendors using VC-capable devices.

Each of the local and remote sides must indicate it is VC capable. This is accomplished by a three-way handshake. Once the local and remote sides are VC aware, a mechanism is necessary to pass application specific information between the local and remote devices. This is accomplished through a VC frame, which contains all the relevant control information.

When a device supporting VC establishes a link, it should determine whether its link partner is VC capable, and, if so, what functionality to activate. Two of the mechanisms are proposed to establish this are: using the three-way VC handshake mechanism and/or using the next page capability of auto-negotiation.

Once the capabilities are exchanged, VC control frames are sent to execute the supported functionalities. The actual triggering of the VC frame is dependent on several factors including the application, the state of the device and implementation dependencies.

VC Handshake

The VC handshake is performed by the exchange of proprietary frames. It has at least two important tasks to perform: 1) to enable the VC mode between the two link partners and 2) to determine common VC capabilities of the two link partners.

The VC handshake mechanism is for full duplex ports and is based on the 802.3x pause control frame used for flow control, as specified in the std. 802.3x. This mechanism has distinct advantages, including being 100% compatible with IEEE standard devices (non-VC mode) and 100% forward compatible with the future VC framework. The mechanism is extensible to new Ethernet standards (10 GE), is independent of media type (copper, fiber, etc.), is a hardware based handshake mechanism and has the flexibility to fine tune the handshake parameters using software.

The VC handshake specification expands upon the MAC pause control frames. It has the following requirements. The handshake should be initiated immediately after link-up, which is after the completion of the auto-negotiation process. The handshake may be initiated by each link partner. It should only be initiated on links in full duplex mode.

Figure 4:
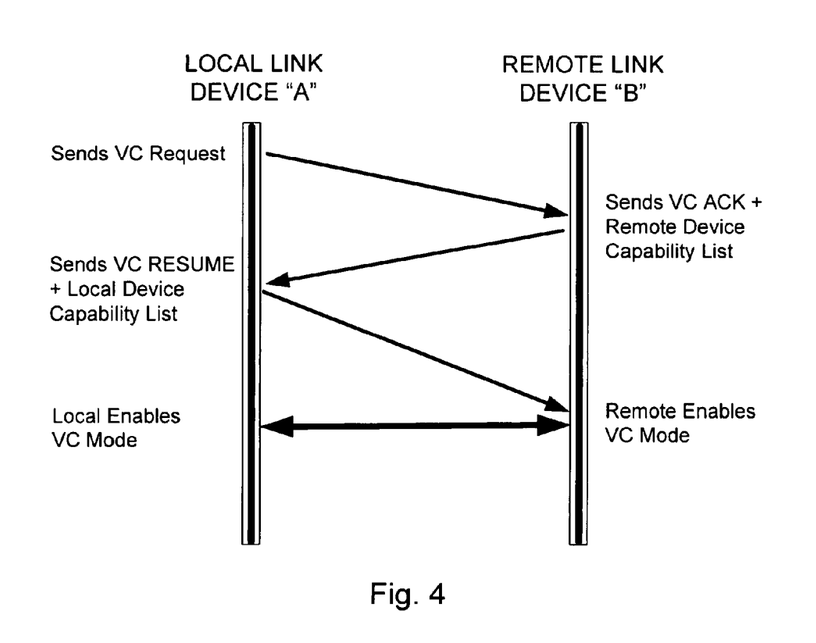
FIG. 4 illustrates the VC three-way handshake process, according to one embodiment of the present invention.

The VC handshake is comprised of three steps. To successfully complete the VC handshake, the third step should be completed. The steps are:

1. REQUEST phase to search for VC compliant link partner. This is initiated by the local side called the requester;

2. ACK phase to confirm and pass VC feature list to the requestor. This is a response from the remote side, called the responder; and 3. RESUME phase to complete the handshake and pass requestor's VC feature list. This is sent by the requester. It indicates the functionality to be supported over this link. These steps are illustrated in FIG. 4.

For all VC handshake frames, the pause timer field should be set according to the current state of the port. The value used should be the same value that would be used if the port were sending a normal pause frame rather than a VC frame. This ensures that non-VC devices connected to this port will act appropriately.

In general, VC capabilities are asymmetrical and involve sending a specific type of VC control frame and involve obeying that type of VC control frame. In order for VC functionality to be enabled, the VC handshake may be initiated from both link partners. Each device that is capable of generating VC frames may initiate a VC handshake by sending a VC REQUEST frame. FIG. 4 shows an overview of the packet flow during the VC handshake.

Figure 5:
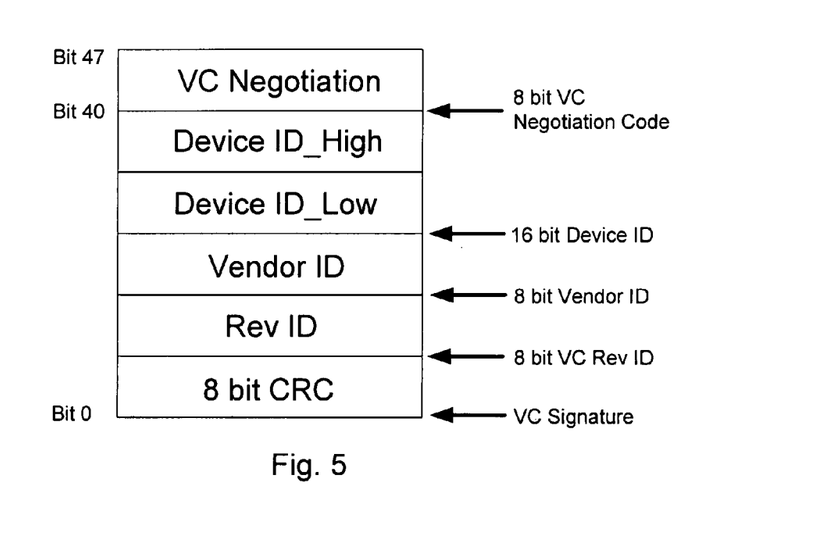
FIG. 5 illustrates an example of VC handshake REQUEST encoding in the MAC-SA address field of "pause control" Ethernet frame.

The request phase, initiated by the local device, is an encoded pause frame sent to the remote device on the link with pause timer value determined by the current state of the port. The frame format follows the standard pause control frame with following field settings:

6 byte DA (destination address) =as specified in standard;
    6 byte SA (source address) =REQUEST phase encoding;
    2 byte Type=MAC control: 88-08;
    2 byte op-code=pause frame: 00-01;
    2 byte pause timer value=according to port's state;
    42 byte of "data payload"=reserved (all zeros); and
    4 byte FCS (frame check sequence).
    Request phase encoding uses the 6 bytes of "don't care" SA address field of pause control frame (Bit 40 of SA address set to "0" to avoid multicast source address). The frame encodes the VC REQUEST with following bit assignment, also shown in FIG. 5:

Bits 47:40 VC negotiation code (VC REQUEST);
Bits 39:24 VC device ID;
Bits 23:12 VC vendor ID;
Bit 11:8 VC revision (Rev) ID; and
Bits 7:0 VC signature.

For the VC signature, an 8-bit checksum is calculated (XOR of bytes in header) and is used as a signature. If this checksum is not correct, the frame should be treated as a normal pause frame. The VC revision ID is an 8-bit VC specification revision ID field. It indicates the VC architectural framework compliance of the local device. This Rev ID is useful for backward compatibility as the VC specification evolves. For first generation devices, the VC revision ID is "1" and up to a maximum of 255 revisions of VC specifications is supported.

The VC vendor ID is an 8-bit vendor ID field. It indicates the vendor ID of the VC silicon. The default value is 0x1. The allocation of the vendor ID is performed when requested by the customer for a unique vendor ID. The intent on providing vendor ID is for system vendors to provide differentiated products and services to their customers. The VC device type is a 16-bit field. It is intended to provide an indication of the capabilities of the device by indicating the family to which it belongs.

The VC negotiation code is an 8-bit field with bit zero always set to "0" (to avoid a source routed frame). The negotiation codes are instrumental in conducting the VC handshake mechanism. Support of up to a maximum of 127 unique negotiation codes is provided. Following are a few example negotiation codes, with others being developed based on future requirements:

VC REQUEST (from local to remote)=0x02;
VC ACK (from remote to local)=0x04;
VC RESUME (from local to remote)=0x06; and
Reserved negotiation code=0x0.

The local has an internal REQ retry timer and REQ retry limits (both programmable by software before link up). The REQ timer is based on the standard pause timer mechanism, except that it is within the local device. If the local does not receive any VC ACK response from remote before the timer expires, the local device re-sends another VC request. The number of VC REQUEST retried by local is controlled by the REQ retry limits value. The default for the internal REQ retry timer is 0x1FFF and the default for the internal REQ retry limits is 3.

The ACKNOWLEDGEMENT (ACK) response phase is an encoded pause frame sent from the remote (responder) back to the local (requester) after receiving the initial VC request packet. If the remote device does not support the VC protocol, the remote device enters a pause state as per the standard pause frame. Otherwise, the fields have the following meaning:

6 byte DA, as specified in standard;
6 byte SA, ACKNOWLEDGEMENT phase encoding;
2 byte Type, MAC control: 88-08;
2 byte op-code, pause frame: 00-01;
2 byte pause timer, according to port's state;
42 byte payload, VC capability list; and
4 byte FCS.

Figure 6:
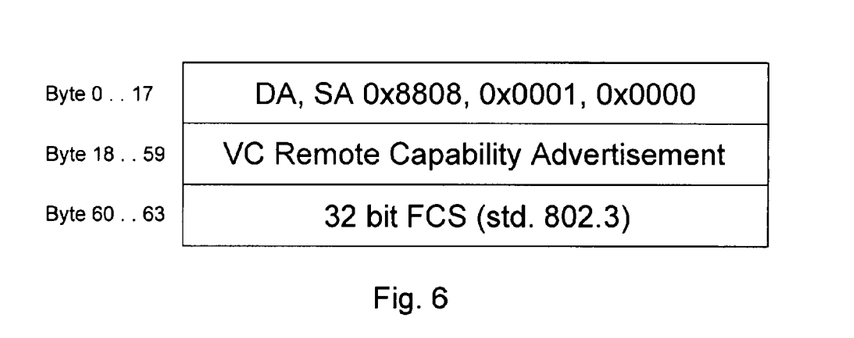
FIG. 6 illustrates an example of VC ACK frame format.

With respect to acknowledgement phase encoding, the 6 byte SA field of the remote device VC ACK and the remote VC identification is encoded with exactly the same semantics as the six bytes of SA address field in the VC REQUEST phase. The description of this field is exactly the same as outlined above in the VC REQUEST phase with remote response and shown in FIG. 5. The 42 bytes of data payload is used to encode the remote device VC capability feature list. This is also discussed in more detail below. The ACK frame format is illustrated in FIG. 6.

The remote has an internal ACK retry timer and ACK retry limits (both programmable by software). The ACK timer is based on the standard. Pause timer mechanism, except that it is within the remote device. If the remote does not receive any VC RESUME response from local before the timer expires, the remote device re-sends another VC ACK. The number of VC ACK sent by remote is controlled by the ACK retry limits value. As an example, the default for the internal ACK retry timer is set to 0x1FFF and the default for the internal ACK retry limits is set to 3.

Figure 7:
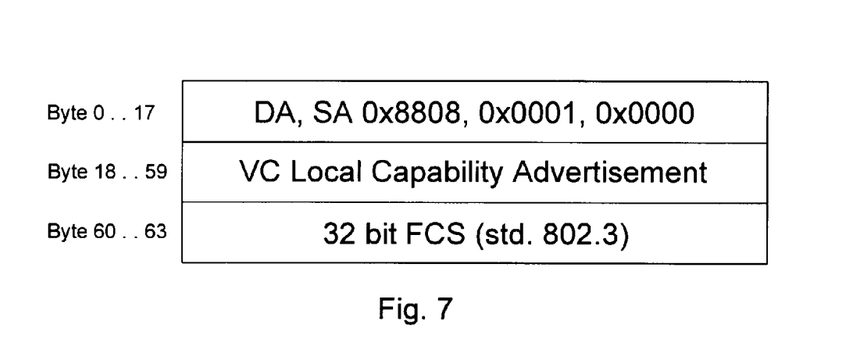
FIG. 7 illustrates an example of VC RESUME frame format.

The RESUME response phase, initiated by the local device, is also an encoded pause frame sent to the remote with pause timer value determined by the port's current state. After receiving the ACK from the remote device, the local device sends the local capability list in the resume frame. The 42 bytes of data payload encode the list of VC functions that should be enabled on the link. FIG. 7 shows the RESUME frame format. The frame format follows 802.3 standard for pause control frames with following field settings:

6 byte DA=as specified in standard;
6 byte SA=RESUME phase encoding;
2 byte Type=MAC control: 88-08;
2 byte op-code=pause frame: 00-01;
2 byte pause timer=according to port's state;
42 byte payload=enabled capability list; and
4 byte FCS.

The 6 byte SA field of local device VC RESUME and local VC identification is encoded with exactly the same semantics as the six bytes of SA address field in the VC REQUEST phase. The description of this field is exactly the same as outlined in VC REQUEST phase, which is illustrated in FIG. 5.

In addition, the VC architecture is also capable of handling special conditions arising during the VC handshake mechanism. One such condition occurs if the VC REQUEST needs to be retried. If the VC ACK response does not come from the remote, the local re-sends another REQUEST, limited to maximum REQ retry limit value. If the REQ retry limit is reached and no ACK has arrived, the local MAC switches to non-VC (standard) mode and supports the standard Ethernet packet flow.

In the case when the VC ACK is retried, i.e. the VC RESUME response does not come from the local, the remote re-sends another ACK, limited to maximum ACK retry limit value. If the ACK retry limit is reached and no RESUME arrived, the remote MAC switches to non-VC (standard) mode.

In addition, a remote device may receive multiple VC REQUEST frames. This can happen if the local device did not receive the VC ACK frame from the remote or the VC ACK frame had CRC errors. The "remote" device should send an ACK frame for each request received. However, the "remote" may send one VC ACK frame if multiple REQUEST frames are received before an ACK is sent by the "remote". Similarly, a local device may receive multiple VC ACK frames. This could happen if the "remote" did not receive the RESUME frame or the RESUME frame has CRC errors. The local should send an ACK frame for each RESUME frame it receives. However, the local may send one RESUME frame if multiple ACKS are received before a RESUME frame is sent.

Also, if the two VC link partners find during the handshake that the other link partner supports a different version of VC specification, then the two VC devices settle for the lowest common denominator feature set between the two versions.

In general, the pause timer value indicated in the VC handshake frame should be obeyed. In this way, pause may be asserted during the VC handshake if required. If a non-zero pause time is specified by the VC handshake frame, then the receiver of the frame may send further VC handshake frames, but it should not send normal frames until the pause time is elapsed (or until pause has been de-asserted).

In order for VC handshake operation to operate, certain registers need to be set. Guidelines for the design of the VC handshake mechanism in the MAC are provided below, where the following items may entail the use of multiple registers. Control of VC subsystems, such as enabling handshake, forcing renegotiation, determining manner of function enabling (automatic or software) etc., should be supported. Registers devoted to VC status should be supported, including a per port register, indicating successful completion of VC handshake and other necessary status information. Registers for the REQUEST phase timer and the REQUEST retry limit counter, discussed above, need to be included, as well as registers for the ACK phase timer and the ACK retry limit counter.

Additional registers are required in respective devices for capability negotiation. These include read only VC capability registers indicating the capabilities of local and remote devices and VC local and remote advertisement registers. The VC advertisement registers are usually a copy of VC capability, and this is the actual value that is advertised by the local and remote device during the handshake. In this way, software can disable some capabilities in local and/or remote device, if desired.

Since the handshake can be initiated by both the link partners, hardware implementation can provide two advertisement registers per device. For example: 1) VC local client advertisement register (read/write register) containing the values to be advertised in the ACK frame sent during the VC handshake. This register indicates the client functions supported by the local device (which VC frames will be obeyed by the local side). 2) VC local server advertisement register (read/write register) containing the values to be sent in the RESUME frame sent during the VC handshake. It indicates the server functions supported by the local device (which VC frames the local side may generate).

In addition, other registers are not strictly required and are thus optional VC registers. For example, a VC device may implement the VC local and remote advertisement register as separate registers for the ACK (client functions) and RESUME (server functions) phases of the handshake. Thus, the local device may have a VC remote advertisement register initialized with the values indicated in the ACK frame received during the VC handshake. This indicates the client functions supported by the remote device. Similarly, the remote device may have a VC local advertisement register initialized with the values indicated in the RESUME frames received during the VC handshake. This indicates the functions supported by the local device.

A VC functionality enabled register may also be required that indicates what VC functionality is actually enabled. This may be configured by software or as a result of the VC handshake.

Lastly, with respect to the VC handshake triggering, the VC handshake frames are typically the first frames exchanged between the devices involved. The handshake should immediately follow the link up state. Thus, a reliable indication of link up is required.

VC Capability Exchange

The VC handshake mechanism allows the link partners to be VC aware. At the same time, VC capabilities are exchanged between the link partners during the ACK and RESUME phases of the handshake. The link partners participating in the VC handshake must support the VC capability registers, which consist of VC control, local VC capability, local VC advertisement and remote VC advertisement registers. It is noted that each of these may be a set of registers depending on implementation, for example, if the register size of the device is smaller than the number of VC capability bits. Each type is referred to as a single register to emphasize the parallel nature of the sets.

The exchange of the capabilities is done via the VC link advertisement register encoded in the data payload of the VC ACK and RESUME frame. Each bit in this sequence may refer to an individual application op-code or to a collection or related application op-codes. A "1" indicates that a specific capability is enabled and "0" indicates that it is disabled. The intent of VC capability registers is to provide the required configuration settings for the VC applications supported by both local and remote devices. In addition VC devices may implement configuration registers which give overall control to enable/disable hardware functionality. The size of all VC capability registers is recommended to be 32 bits for the initial version.

The bits in each VC capability register can refer to the same functionality. However, the significance depends on whether the register represents the local or remote ability. The following TABLE 1 is an implementation example to show the applications supported in one version of the VC architecture.

TABLE 1

| Bit | Description |
| --- | --- |
| 0 | Device can generate priority SFC frames |
| 1 | Device can obey priority SFC frames |
| 2 | Device can generate flow ID SFC frames |
| 3 | Device can obey flow ID SFC frames |
| 4 | Device can generate egress priority SFC frames |
| 5 | Device can obey egress priority SFC frames |
| 31:6 | Reserved. |

Each VC aware device supports the following sets of registers. The local VC capability register is a read only register set. The register defines the set of capabilities of which the local device is capable. The local VC advertisement register is a read/write register set. This register advertises the local VC capability to the remote. It may be initialized in one of two ways: it may be 0 to advertise no abilities by default, and thus software is required to change the register, or it may be copied from the local VC ability register.

The remote VC advertisement register is a read only register set, but its value is determined by the VC negotiation. This register is populated by the local when it receives the ACK frame, and by the remote when it receives the RESUME frame during the handshake.

The VC functionality enabled register is a read/write register set. The purpose of this register is to enable the hardware functionality of the indicated VC operations. The default value of this register may be indicated in one of two ways depending on configuration settings and is determined by the result of the VC Handshake frames. The ability to generate a certain VC frame type (that is, to be a server for this operation)

is enabled if the device is capable of this function (as indicated in the Local Ability register) and the corresponding VC Frame obey function is advertised by the remote device (as indicated in the Remote Advertisement register). Alternatively, the ability to obey a certain VC frame type (that is, to be a client for this operation) is enabled if the device is capable of this function (as indicated in the Local Ability register) and the remote device is capable of generating that frame type.

VC Frame Format

The VC frame format has been developed to meet many requirements. Included in these requirements is to provide point-to-point communication, to enable end-to-end communication and enable redirection of packet to a CPU. Other requirements include allowing customer specific functionality, a scalable frame format to allow complex applications, and to enable use of Ethertype for purposes other than VC. The various formats for VC frames are described below.

Figure 8:
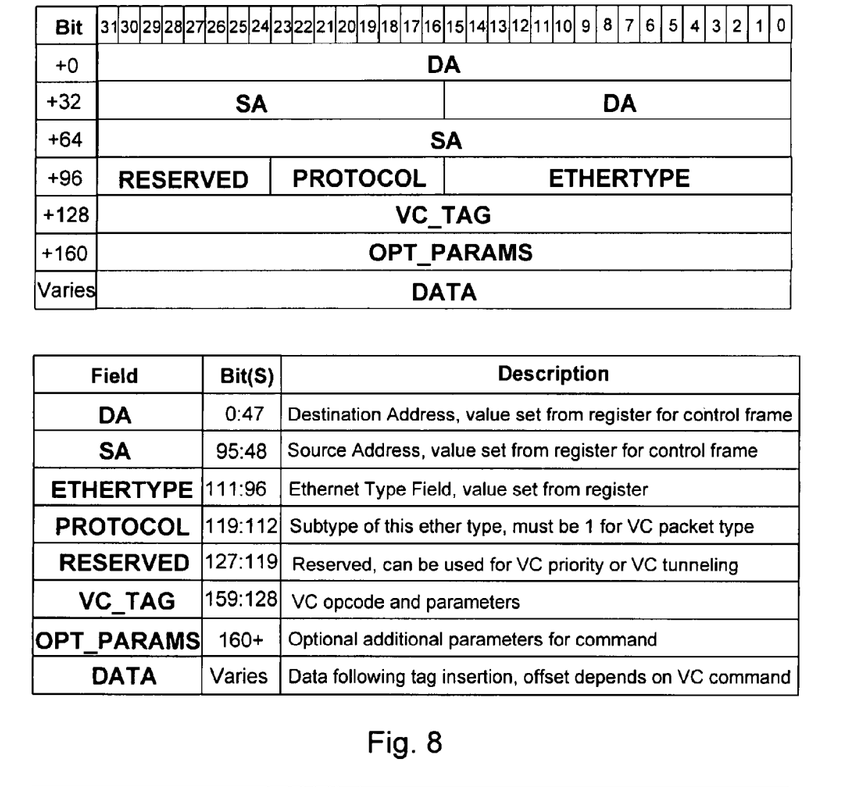
FIG. 8 illustrates an example of VC frame format.

FIG. 8 illustrates one embodiment of the VC frame format. The VC frame is an Ethernet II frame with an Ethertype value assigned by IEEE. The destination MAC address should be the unicast address of the directly connected device or the reserved multicast address 01-80-c2-00-00-01. It is noted that although the reserved multicast address is reserved for IEEE802.3x PAUSE frame, a VC frame with this DA should be sent only when both ends are VC aware.

The source address should be that of the device sending the VC frame. The Ethertype field represents the Ethertype value assigned by IEEE. The protocol field represents the type of application. For VC applications this field MUST be 1. This field permits applications other than VC to use frames with this Ethertype.

The VC tag may have one of the three formats as discussed below. In the VC_TAG_TYPE0 frame format, illustrated in FIG. 9, the OPCODE0 field is of 8 bits and parameters field is of 24 bits in the first word. The parameter field can be extended is necessary and is really dependent on the op-code.

Figure 9:
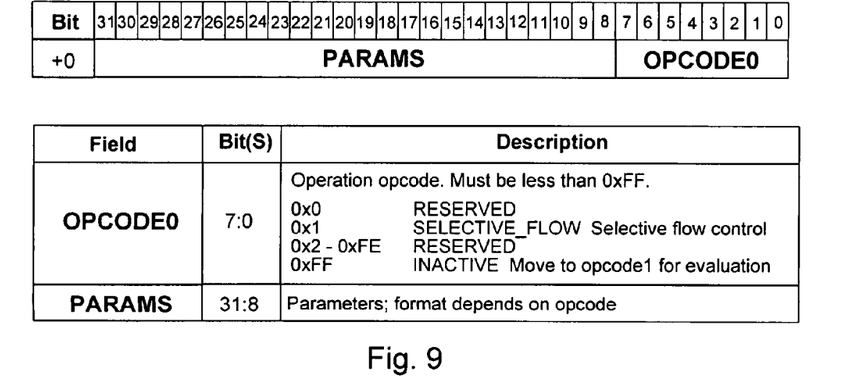
FIG. 9 illustrates an example of VC frame format for Type 0.

The 8-bit OPCODE0 field represents the op-code of an application and the associated function. The value of 0xFF is a reserved value, which indicates that the next 8 bits is the op-code value. If the value of OPCODE0 is other than 0xFF, then the fields following the OPCODE0 is a parameter field. The rest of this word may be occupied by parameters for Type 0 op-codes.

Figure 10:
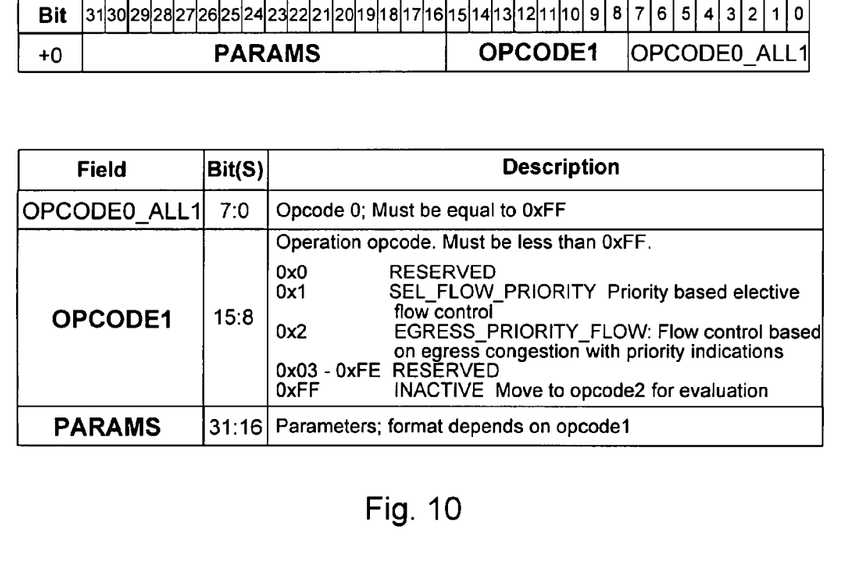
FIG. 10 illustrates an example of VC tag format for Type 1.

In the VC_TYPE_TAG1 VC tag format, illustrated in FIG. 10, the OPCODE0 field is inactive (has a value of 0xFF) and OPCODE1 is active. For OPCODE1 to be active, the value must be less than 0xFF. Up to 16 bits are available for the parameters in the first word. The width of the parameter field is dependent on the OPCODE1 value.

Figure 11:
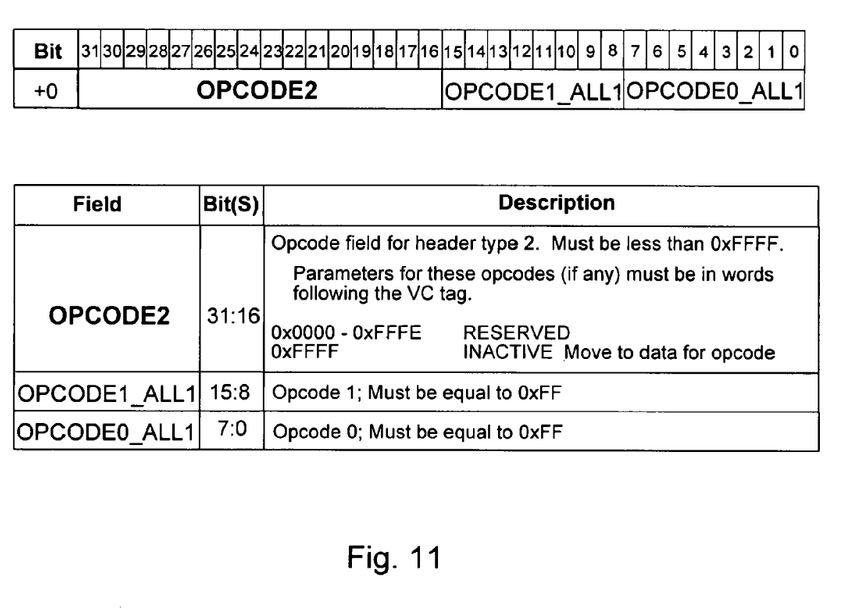
FIG. 11 illustrates an example of VC tag format for Type 2.
Figure 12:
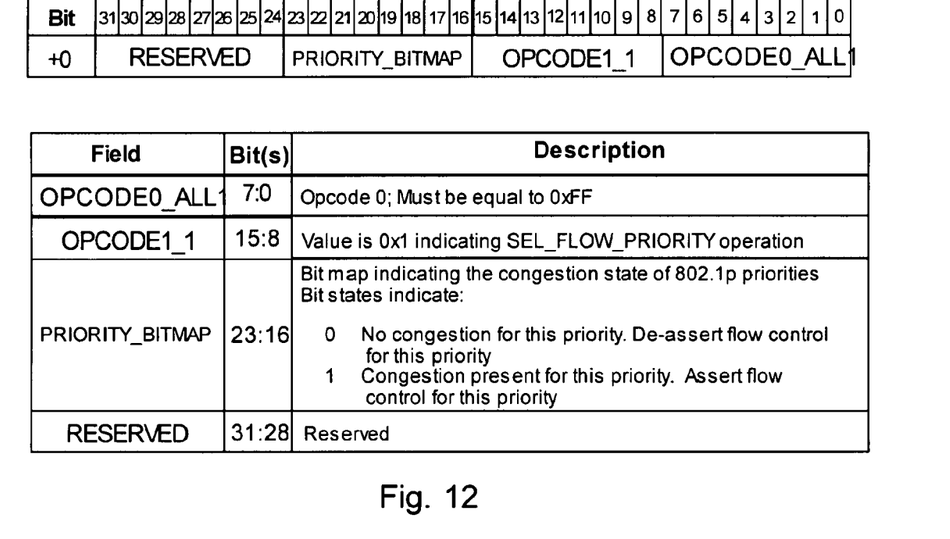
FIG. 12 illustrates an example of VC tag for priority based selective flow control.

In the VC_TYPE_TAG2 VC tag format, illustrated in FIG. 11, the OPCODE0 and OPCODE1 field are inactive and OPCODE2 is active. For OPCODE2 to be active, OPCODE0 must be 0xFF and OPCODE1 MUST be 0xFF. Any parameters to these opcodes must be placed in subsequent words. The format of those depends on the OPCODE2 value.

Auto-Negotiation

The auto-negotiation function allows a device to advertise enhanced modes of operation it possesses to a device at the remote end of a link segment and to detect corresponding enhanced operational modes that the other device may be advertising. The complete implementation details on auto-negotiation are explained in IEEE802.3 specifications. The virtual channel (VC) capability is established between the two link partners by adding new bits and new registers to the IEEE802.3 specifications.

VC capable devices can use the next-page feature in the standard auto-negotiation arbitration mechanism to allow exchange of VC capabilities. The next page format for VC capability exchange is implementation dependent.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for controlling flow between network devices, the method comprising:
receiving a flow message from at least one of a plurality of first network devices by a second network device, the flow message indicating congestion at the at least one first network device;
receiving an Ethernet frame by the second network device, wherein the Ethernet frame is interpreted as a pause frame if the second network device has not acknowledged an ability to establish a logical connection between network devices over a physical connection;
halting, by the second network device, transmission of selected packets associated with the flow message; and
continuing transmission, by the second network device, of packets not associated with the flow message.

2. The method of claim 1, wherein the flow message includes a flow identifier and halting further comprises suspending transmission of the selected packets associated with the flow identifier.

3. The method of claim 1, wherein the flow message identifies priority information of the packets, and halting further comprises suspending transmission of the selected packets associated with the priority information.

4. The method of claim 3, wherein the at least one first network device comprises a switch and wherein the second network device is connected to the switch and transmits packets to the switch for forwarding to a plurality of network devices connected to the switch.

5. The method of claim 3, wherein the flow message further includes a criterion for resuming transmission and wherein transmission of the selected packets associated with the flow message is resumed when the criterion for resuming transmission is satisfied.

6. The method of claim 5, wherein the criterion is time duration for a selective halt.

7. The method of claim 2, wherein suspending transmission includes resuming transmission of the selected packets associated with the flow message when an indication is received that the congestion at the at least one first network device is reduced.

8. A network device comprising: at least one processor operable to:

receive a flow message from a switch, wherein the flow message indicates congestion in at least one logical channel;
receive an Ethernet frame that is interpreted as a pause frame if the switch does not acknowledge an ability to establish a logical connection between network devices over a physical connection;
halt transmission of selected packets associated with the flow message; and
continue transmission of packets not associated with the flow message.

9. The network device of claim 8, wherein the flow message identifies priority information of the packets, and halting further comprises selectively excluding selected packets associated with the priority information.

10. The network device of claim 9, wherein the network device is a server.

* * * * *